United States Patent
Johnson et al.

(10) Patent No.: US 8,064,077 B2
(45) Date of Patent: Nov. 22, 2011

(54) AUTOMATIC PRINT JOB CANCELLATION MECHANISM

(75) Inventors: Charles D. Johnson, Boulder, CO (US); Lisa A. Morgan, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 636 days.

(21) Appl. No.: 12/263,095

(22) Filed: Oct. 31, 2008

(65) Prior Publication Data

US 2010/0110475 A1    May 6, 2010

(51) Int. Cl.
*G06K 15/00* (2006.01)
*G06F 3/12* (2006.01)
(52) U.S. Cl. ..................... 358/1.14; 358/1.15
(58) Field of Classification Search ............... 358/1.14, 358/1.15
See application file for complete search history.

(56) References Cited

U.S. PATENT DOCUMENTS

| | | | |
|---|---|---|---|
| 6,327,044 B1 | 12/2001 | Shima | |
| 6,900,906 B1 * | 5/2005 | Tanaka | 358/1.16 |
| 7,315,404 B2 | 1/2008 | Kimura | |
| 2002/0044299 A1 * | 4/2002 | Iwase et al. | 358/1.15 |
| 2002/0051166 A1 * | 5/2002 | Tomita | 358/1.13 |
| 2002/0131069 A1 * | 9/2002 | Wanda | 358/1.14 |
| 2004/0080772 A1 * | 4/2004 | Snyders | 358/1.14 |
| 2004/0190039 A1 | 9/2004 | Lay et al. | |
| 2004/0267868 A1 | 12/2004 | Wilk | |
| 2006/0001901 A1 | 1/2006 | Kidani et al. | |
| 2006/0218431 A1 * | 9/2006 | Tanaka et al. | 714/4 |
| 2007/0024888 A1 | 2/2007 | Bailey et al. | |
| 2007/0206210 A1 | 9/2007 | Miyazaki et al. | |
| 2008/0212124 A1 * | 9/2008 | Hirama | 358/1.14 |

* cited by examiner

*Primary Examiner* — Charlotte M Baker
*Assistant Examiner* — Fred Guillermety
(74) *Attorney, Agent, or Firm* — Blakely, Sokoloff, Taylor & Zafman LLP

(57) ABSTRACT

A method for providing computer services is disclosed. The method includes a printer receiving an expected size of print data from a computer system during a printing operation, the printer receiving the print data, determining if the size of the print data is less than the expected size of the print data and aborting the printing operation if the size of the print data is less than the expected size of the print data.

20 Claims, 2 Drawing Sheets

AUTOMATIC PRINT JOB CANCELLATION MECHANISM

FIELD OF THE INVENTION

The invention relates to the field of printing, and in particular, to automatic cancellation of a print job.

BACKGROUND

Printers receive and print data files (print jobs) that are submitted by host computer systems. Whenever a print job includes an error, a printer typically receives and prints the data from the beginning of the print job up to the point of the error. This behavior is common for a number of reasons (e.g., it is easy to implement, it may not be possible or practical to withhold printing a job until the complete job is received and processed, and a typical print policy is to print as much of a job as possible, even if the job contains an error).

In the case of a high speed production printer it may be desirable to avoid printing any part of a job when the job is known to include errors. By not printing a job that includes an error, waste production is avoided, as well as time required to implement a recovery process of printing a portion of the job. One particular type of error that may occur is a short print job, otherwise referred to as a "short job". A short job occurs when the amount of data that the printer receives for a print job is less than the complete job.

A short job may occur due to a network error, or premature termination of the transfer by the host system. The early termination of a file transfer due to a transmission problem is typically not detectable by the printer. However, in some systems the printer is capable of detecting the correct size of a complete print job in advance.

Accordingly, a mechanism to discontinue processing a short job at a printer is desired.

SUMMARY

In one embodiment, a method for providing computer services is disclosed. The method includes a printer receiving an expected size of print data from a computer system during a printing operation, the printer receiving the print data, determining if the size of the print data is less than the expected size of the print data and aborting the printing operation if the size of the print data is less than the expected size of the print data.

Another embodiment discloses a network. The network includes a computer system to initiate a print operation and a printer to receive an expected size of print data from the computer system during a printing operation prior to receiving the print data, to determine if the size of the print data is less than the expected size of the print data and to abort the printing operation if the size of the print data is less than the expected size of the print data.

A further embodiment discloses an article of manufacture comprising a machine-readable medium including data that, when accessed by a machine, cause the machine to perform operations comprising a printer receiving an expected size of print data from a computer system during a printing operation, the printer receiving the print data, determining if the size of the print data is less than the expected size of the print data and aborting the printing operation if the size of the print data is less than the expected size of the print data.

In still a further embodiment, a printer includes a control unit to receive an expected size of print data from a computer system during a printing operation prior to receiving the print data, to determine if the size of the print data is less than the expected size of the print data and to abort the printing operation if the size of the print data is less than the expected size of the print data.

BRIEF DESCRIPTION OF THE DRAWINGS

A better understanding of the present invention can be obtained from the following detailed description in conjunction with the following drawings, in which.

DETAILED DESCRIPTION

A mechanism for the automatic cancellation of short print jobs is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
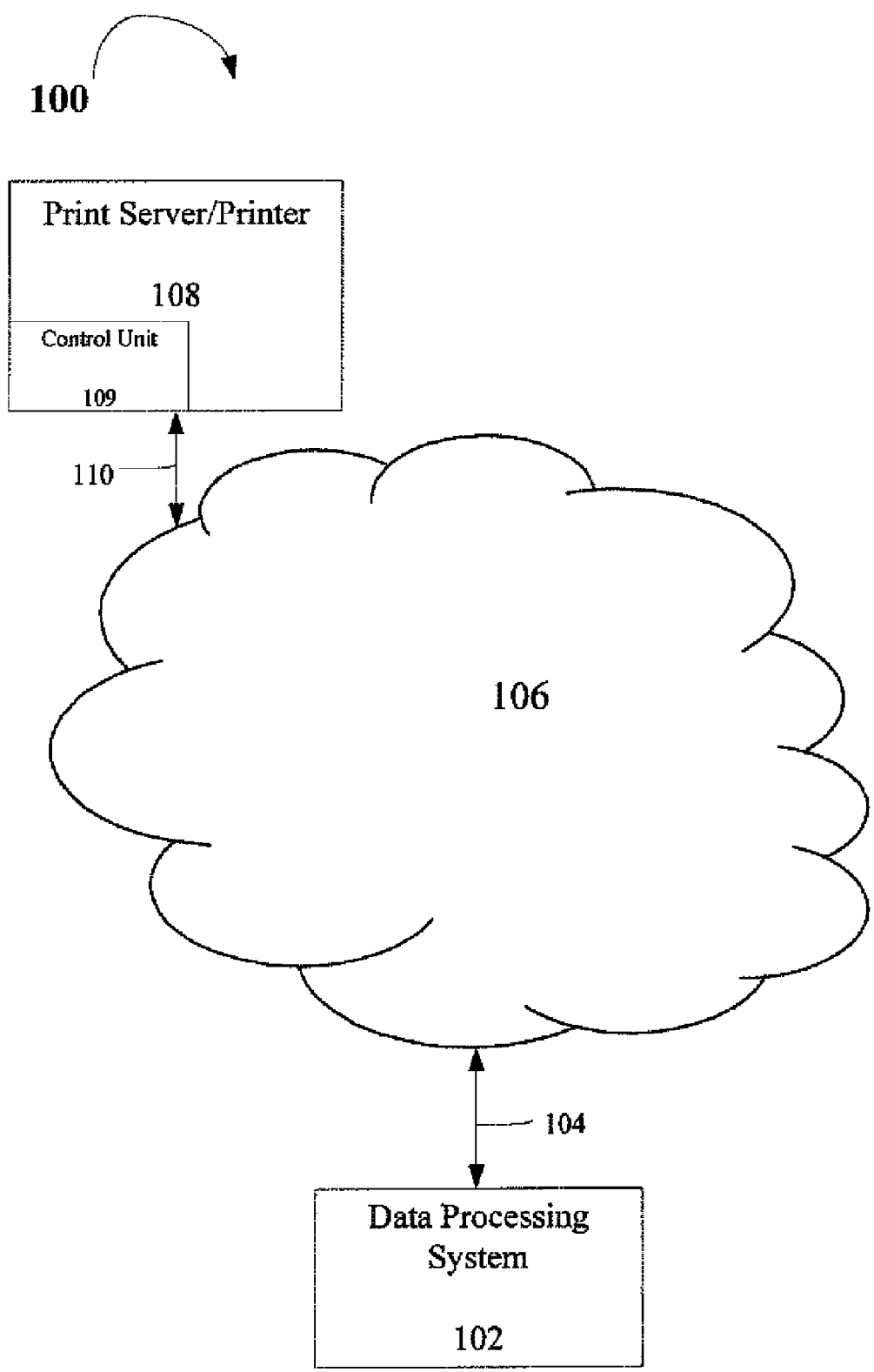
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server/printer 108 serving print requests over network 106 received via communications link 110 between print server/printer 108 and network 106. The operating system on data processing system 102 is capable of selecting print server/printer 108 and submitting requests for services to print server/printer 108 over network 106. Print server/printer 108 includes a print queue for print jobs requested by remote data processing systems 102. Further, print server/printer 108 includes a control unit 109 to perform operations associated with printing a request.

Although described as incorporated within the same entity, other embodiments may include the print server and the printer as being physically separate components. Therefore, the data processing system network 100 depicted in FIG. 1 is selected for the purposes of explaining and illustrating the present invention and is not intended to imply architectural limitations. Those skilled in the art will recognize that various additional components may be utilized in conjunction with the present invention.

According to one embodiment, data processing system 102 implements a job transmission protocol to transmit print jobs to print server/printer 108. In such an embodiment, the job transmission protocol provides the ability for control unit 109 at print server/printer 108 to determine the size of a print job prior to receiving the data for the job. In one embodiment, the job transmission protocol is implemented with a Hot Folders protocol. However, other job transmission protocols (e.g., Line Printer Remote (LPR) and Push Print) may be implemented in other embodiments.

Figure 2:
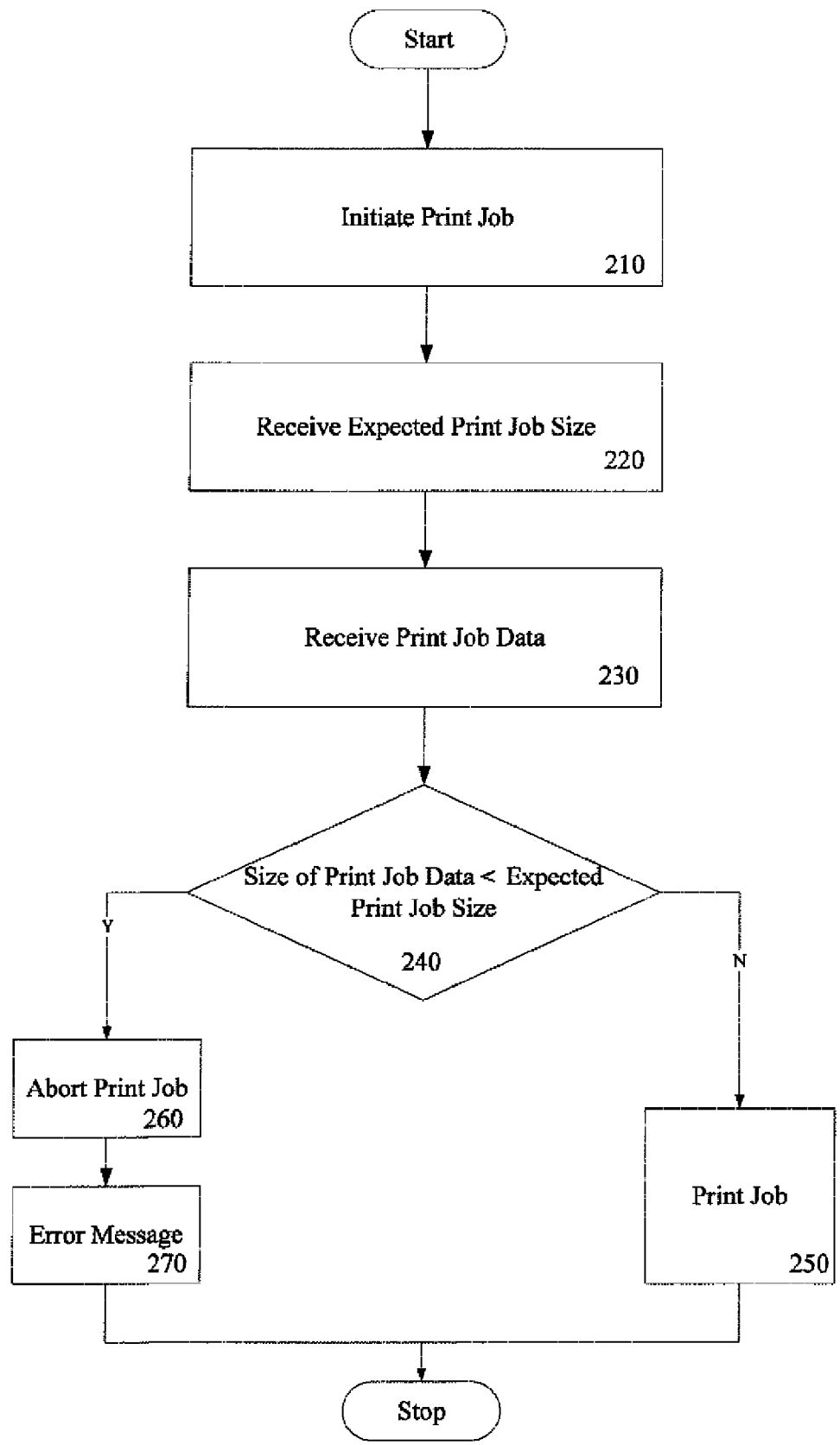
FIG. 2 is a flow diagram illustrating one embodiment for cancellation of a print job.

FIG. 2 is a flow diagram illustrating one embodiment of the operation of control unit 109 for cancelling a short print job at print server/printer 108. At processing block 210, a user at data processing system 102 initiates a print job by forwarding a job to print server/printer 108. At processing block 220, print server/printer 108 receives data prior to the transmission of the print job data from print server/printer 108 that enables print server/printer 108 to determine the size of the print job. At processing block 230, print server/printer 108 receives the print job data.

In a Hot Folders embodiment, a CloseFile message is received at print server/printer 108, subsequently a worker thread in the Hot Folders protocol makes a check to insure that the entire file was transferred. At decision block 240, it is determined whether the size of the received print job data is less than the expected print job size.

If the print job data is greater than or equal to the amount of data expected, the print job data is accurate and thus printed, processing block 250. If, however, the print job data is less than what was expected, a short job has been received. Consequently, the short job is aborted at print server/printer 108, processing block 260. At processing block 270, text is displayed at print server/printer 108 indicated that a short job has occurred. In an additional embodiment, an indication of the error may be transmitted back to data processing system 102 to alert the user of the error.

The above-described print cancellation mechanism enables a short print job to be aborted, thus eliminating a print job resulting in a processing error or an otherwise undesirable output that would result in inefficient use of a high speed printer.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method for providing computer services, comprising:
a printer receiving an expected size of print data from a computer system during a printing operation;
the printer receiving the print data;
determining if the size of the print data is less than the expected size of the print data; and
aborting the printing operation if the size of the print data is less than the expected size of the print data.

2. The method of claim 1 further comprising displaying an error message at the printer after aborting the printing operation.

3. The method of claim 2 further comprising transmitting an error message to the computer system.

4. The method of claim 1 further comprising printing the data if the size of the print data is equal to the expected size of the print data.

5. The method of claim 1 further comprising the computer system initiating the print operation by executing a print command.

6. The method of claim 1 wherein the print operation between the printer and the computer system is implemented by a job transmission protocol.

7. The method of claim 6 wherein the job transmission protocol is one of a Hot Folders, Line Printer Remote (LPR) and Push Print protocols.

8. A network comprising:
a computer system to initiate a print operation; and
a printer to receive an expected size of print data from the computer system during a printing operation prior to receiving the print data, to determine if the size of the print data is less than the expected size of the print data and to abort the printing operation if the size of the print data is less than the expected size of the print data.

9. The network of claim 8 wherein the printer displays an error message at the printer after aborting the printing operation.

10. The network of claim 8 wherein the printer prints the data if the size of the print data is equal to the expected size of the print data.

11. The network of claim 8 wherein the print operation between the printer and the computer system is implemented by a job transmission protocol.

12. The network of claim 11 wherein the job transmission protocol is one of a Hot Folders, Line Printer Remote (LPR) and Push Print protocols.

13. An article of manufacture comprising a machine-readable medium including data that, when accessed by a machine, cause the machine to perform operations comprising:
a printer receiving an expected size of print data from a computer system during a printing operation;
the printer receiving the print data;

determining if the size of the print data is less than the expected size of the print data; and aborting the printing operation if the size of the print data is less than the expected size of the print data.

14. The article of manufacture of claim 13, wherein the machine-accessible medium include data that cause the machine to perform further operations comprising displaying an error message at the printer after aborting the printing operation.

15. The article of manufacture of claim 13, wherein the machine-accessible medium include data that cause the machine to perform further operations comprising printing the data if the size of the print data is equal to the expected size of the print data.

16. The article of manufacture of claim 13 wherein the print operation between the printer and the computer system is implemented by a job transmission protocol.

17. A printer comprising:

a control unit to receive an expected size of print data from a computer system during a printing operation prior to receiving the print data, to determine if the size of the print data is less than the expected size of the print data and to abort the printing operation if the size of the print data is less than the expected size of the print data.

18. The printer of claim 17 further comprising a display to display an error message after aborting the printing operation.

19. The printer of claim 17 wherein the printer prints the data if the size of the print data is equal to the expected size of the print data.

20. The printer of claim 17 wherein the print operation between the printer and the computer system is implemented by a job transmission protocol.

\* \* \* \* \*